US010827121B2

(12) United States Patent
Fukai et al.

(10) Patent No.: US 10,827,121 B2
(45) Date of Patent: Nov. 3, 2020

(54) IMAGE STABILIZING DEVICE AND CONTROL METHOD THEREOF

(71) Applicant: CANON KABUSHIKI KAISHA, Tokyo (JP)

(72) Inventors: Yosuke Fukai, Kawasaki (JP); Kiyoshi Nitto, Saitama (JP); Toshihiro Ogawa, Tokyo (JP); Junichiro Iwamatsu, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/225,017

(22) Filed: Dec. 19, 2018

(65) Prior Publication Data
US 2019/0215456 A1    Jul. 11, 2019

(30) Foreign Application Priority Data

Jan. 11, 2018  (JP) ................. 2018-002299

(51) Int. Cl.
*H04N 5/232* (2006.01)
*G06T 5/00* (2006.01)
*G02B 7/04* (2006.01)
*H04N 5/235* (2006.01)
*H04N 5/225* (2006.01)

(52) U.S. Cl.
CPC ......... *H04N 5/23267* (2013.01); *G02B 7/04* (2013.01); *G06T 5/003* (2013.01); *H04N 5/2254* (2013.01); *H04N 5/2353* (2013.01); *H04N 5/23229* (2013.01); *H04N 5/23287* (2013.01); *H04N 5/23296* (2013.01)

(58) Field of Classification Search
CPC ............ H04N 5/23267; H04N 5/2328; H04N 5/23287; H04N 5/2254; H04N 5/23229; H04N 5/23296; H04N 5/2353; G02B 7/04; G06T 5/003
See application file for complete search history.

(56) References Cited

U.S. PATENT DOCUMENTS

2012/0113515 A1*  5/2012  Karn ................. H04N 5/23248
                                                  359/557
2018/0278829 A1  9/2018  Fukai et al.
2018/0278915 A1  9/2018  Ogawa et al.

FOREIGN PATENT DOCUMENTS

JP          2009145852 A       7/2009

* cited by examiner

*Primary Examiner* — Nicholas G Giles
(74) *Attorney, Agent, or Firm* — Carter, Deluca & Farrell LLP

(57) ABSTRACT

A digital camera controls a blur correction lens used to correct image blur occurring due to vibration applied to the digital camera. The digital camera controls a focus lens used for focus adjustment and a zoom lens used to change an angle of view in connection with driving of the blur correction lens during exposure to an image sensor.

13 Claims, 11 Drawing Sheets

IMAGE STABILIZING DEVICE AND CONTROL METHOD THEREOF

BACKGROUND OF THE INVENTION

Field of the Invention

The present invention relates to an image stabilizing device and a control method thereof.

Description of the Related Art

As a magnification of image pickup apparatuses such as cameras and video apparatuses increases, vibration applied to an image pickup apparatus, such as hand tremor, easily becomes conspicuous at a telescopic end and thus a high-performance image stabilizing mechanism is required. An image stabilizing mechanism is a mechanism for detecting hand tremor of a photographer and driving some of lenses constituting an imaging optical system in a direction approximately perpendicular to an optical axis to cancel out the hand tremor of the photographer. In such an image stabilizing mechanism, a blur correction lens operates away from the optical axis of the imaging optical system in order to correct captured image blur (image blur) occurring due to hand tremor. Japanese Patent Laid-Open No. 2009-145852 discloses a camera which obtains a third focusing position to which a focus lens is actually moved by weighting a first focusing position based on distance measurement and a second focusing position based on focus detection on the basis of the amount of hand tremor.

Since it is necessary to move the blur correction lens greatly in order to satisfy a demand for performance improvement in an image stabilizing mechanism, the blur correction lens moves far away from the optical axis. When the blur correction lens is driven and moves far away from the optical axis, a subject contrast at the center of an image decreases and optical performance deteriorates. An image pickup apparatus employing a contrast AF method as a focus detection method drives a focus lens to a position at which the contrast of a predetermined subject is high in order to focus the subject in a through image before starting exposure. When the subject is focused once, the image pickup apparatus maintains the position of the focus lens. However, when a camera is shaken due to hand tremor of a photographer or the like even in a state in which the subject has been focused, the hand tremor is detected in the camera and a blur correction lens operates. In addition, when the blur correction lens moves far away from the optical axis, a subject contrast at the center of an image decreases and a through image is brought into a so-called out-of-focus state.

In addition, when exposure to an imaging sensor starts, the focus lens is fixed and held without being driven during exposure. However, since hand tremor of the photographer may be detected and the blur correction lens may be driven in the camera even during exposure, an image exposed in a state in which the subject contrast has decreased may be obtained as a captured image. Accordingly, an image pickup apparatus which limits driving of a blur correction unit to a predetermined driving range in which image deterioration does not occur according to aberration before exposure if a driving amount of a blur correction lens is large may be conceived, for example. Further, an image pickup apparatus which obtains a satisfactory image without decreasing the contrast of a subject by driving a focus lens in connection with a correction operation of a blur correction lens during exposure may be conceived, for example.

However, in an image pickup apparatus which limits driving of the blur correction lens, an image stabilizing effect decreases. In addition, even in cases in which the image pickup apparatus which drives the focus lens in connection with a correction operation of the blur correction lens is applied, when the focus lens is driven on the basis of movement of the blur correction lens during exposure of a still image, an angle of view deviates during exposure and thus a captured image deteriorates.

SUMMARY OF THE INVENTION

The present invention provides an image stabilizing device capable of obtaining satisfactory captured images while providing an image stabilizing effect.

An image stabilizing device according to an embodiment of the present invention includes a first control unit configured to control a blur correction unit used to correct image blur occurring due to vibration applied to an image pickup apparatus, and a second control unit configured to control a first optical member used for focus adjustment and a second optical member used to change an angle of view in connection with driving of the blur correction unit during exposure to an imaging unit.

Further features of the present invention will become apparent from the following description of exemplary embodiments with reference to the attached drawings.

DESCRIPTION OF THE EMBODIMENTS

Figure 1:
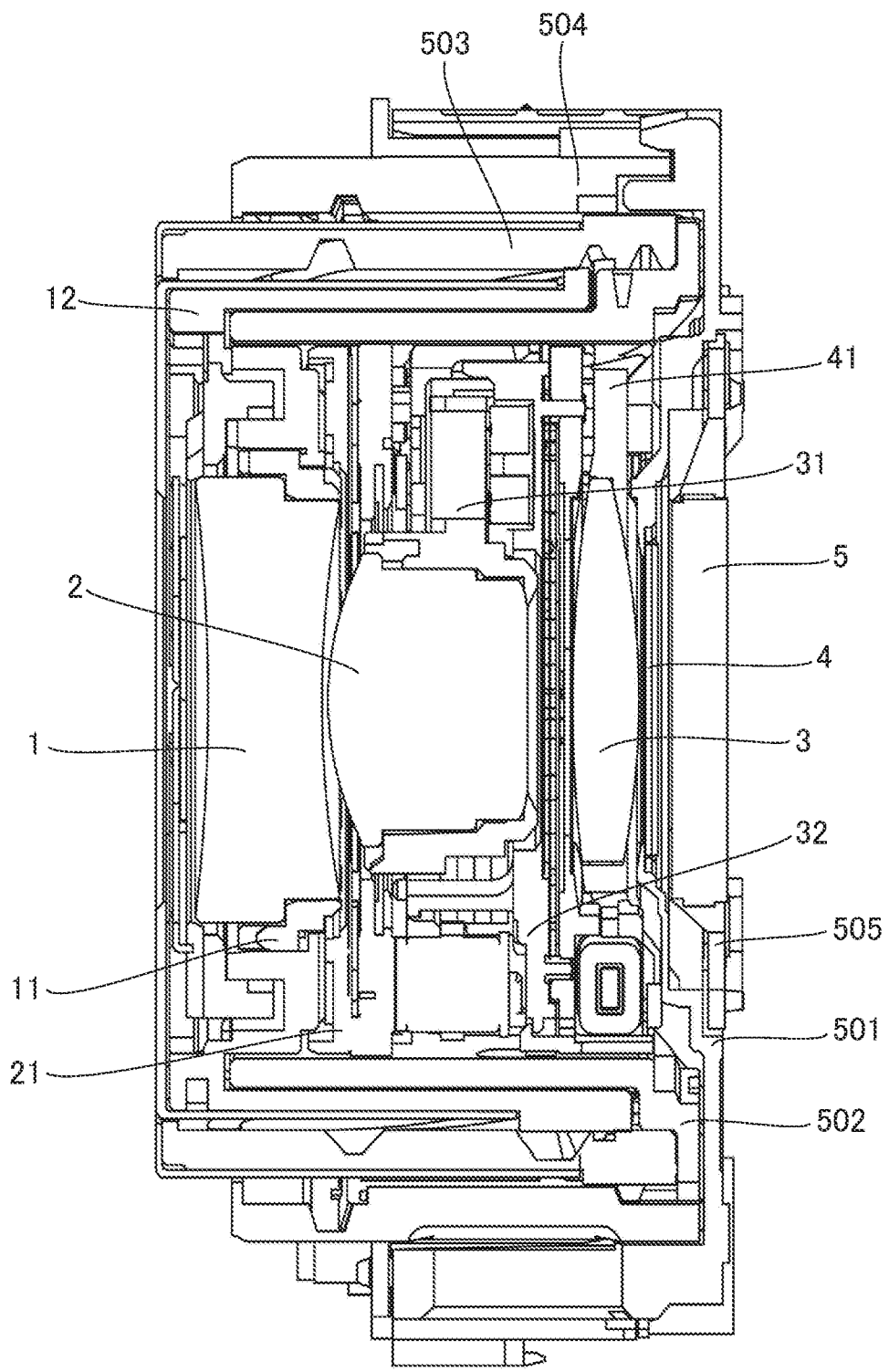
FIG. 1 is a diagram showing a collapsed state.

A configuration of an image pickup apparatus including an image stabilizing device according to the present embodiment will be described with reference to FIGS. 1 to 3.

A lens barrel included in the image pickup apparatus of the present embodiment has a 3-lens groups configuration. Specifically, the lens barrel includes a first-group unit composed of a first-group lens holding frame 11 which holds a first lens group 1 and a first-group ground plate 12 including a lens barrier member which holds the first-group lens holding frame 11 and protects the lenses. In addition, the lens barrel includes a diaphragm unit 21 which is a member for adjustment of the quantity of light during photographing, a second-group unit composed of a second-group lens holding frame 31 which holds a second lens group 2 and a second-group ground plate 32 including a shutter member which is not shown, and a third-group lens holding frame 41 which holds a third lens group 3. The first-group unit, the diaphragm unit and the second-group unit are lens groups of a variable power system. The second-group unit includes an image stabilizing mechanism, and the second-group lens holding frame 31 moves in a direction approximately perpendicular to an optical axis during photographing to correct image blur occurring due to hand tremor during photographing. The third lens group 3 is a focus lens group for focusing a subject.

FIG. 1 is a diagram showing a collapsed state in which lens groups are included. If a lens barrel is in a collapsed state, an image pickup apparatus is in a photographing standby state. FIG. 2 is a diagram showing a photographing state in which the first-group lens holding frame 11, the second-group lens holding frame 31 and the third-group lens holding frame 41 extend in an optical axis direction. The focus lens group and an imaging element 5 are attached to a sensor holder unit. The imaging element 5 is held by the sensor holder 501 through a sensor plate 505, and an optical filter 4 is disposed in front of the imaging element 5 by being interposed between the sensor holder 501 and a sensor rubber material which is not shown.

Figure 3:
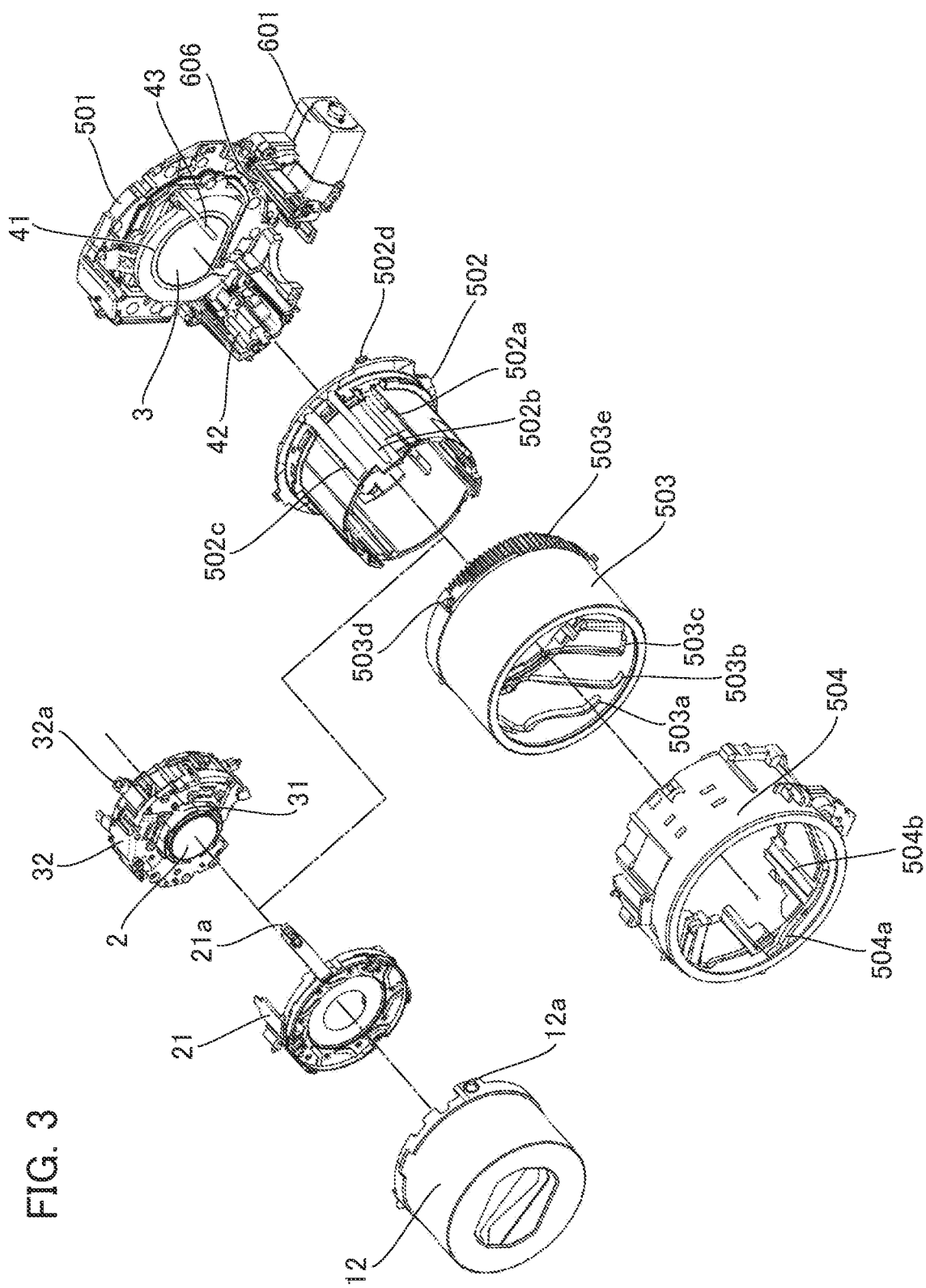
FIG. 3 is an example of an exploded perspective view of a lens barrel.
Figure 4:
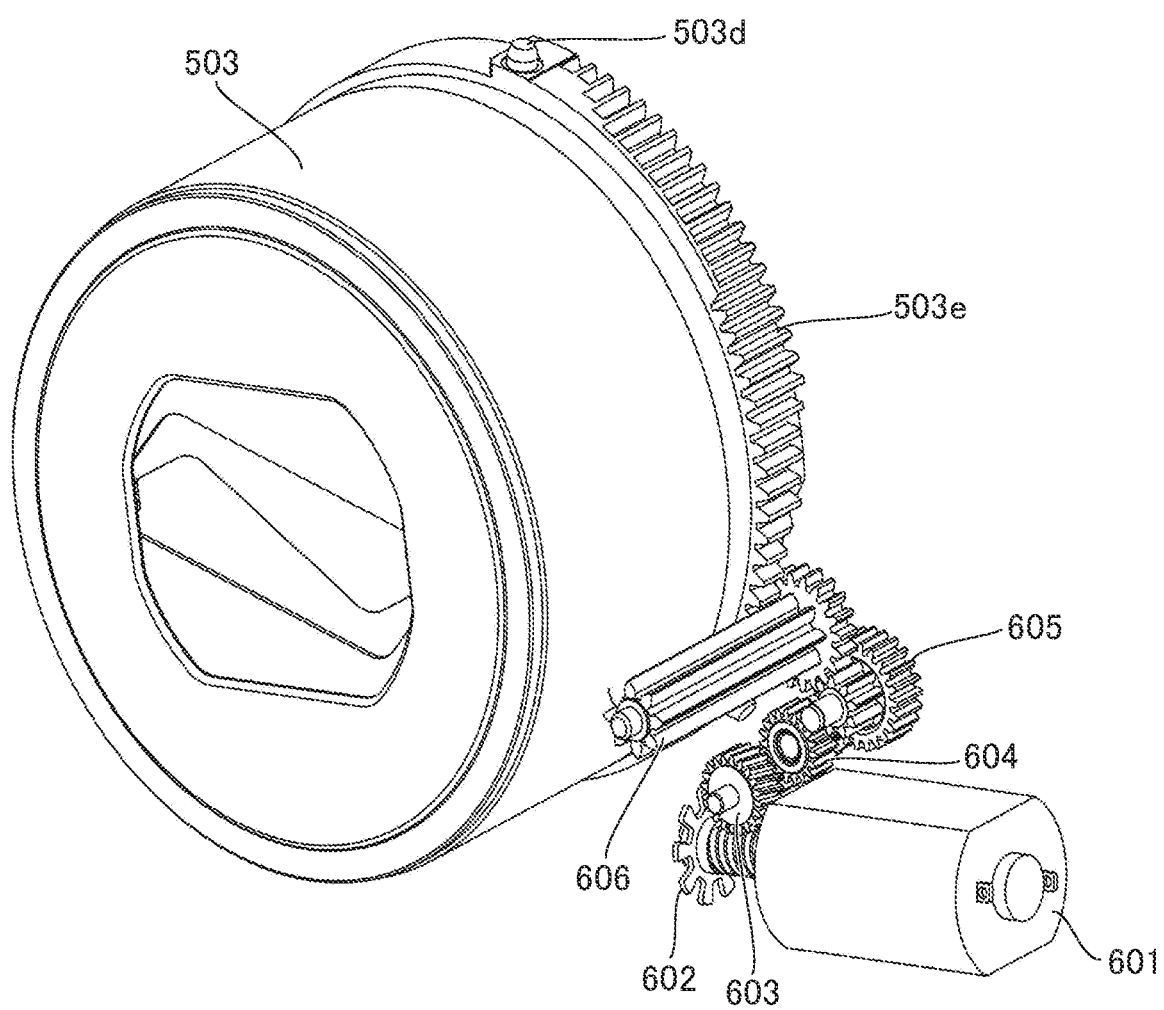
FIG. 4 is a diagram showing an example of a configuration of surroundings of a movable cam ring.

FIG. 3 is an example of an exploded perspective view of the lens barrel. In addition, FIG. 4 shows an example of a configuration of the surroundings of a movable cam ring. As shown in FIG. 3, the lens barrel included in the image pickup apparatus of the present embodiment is composed of a fixed cam ring 504 which is a component constituting a zoom mechanism and a sensor holder unit fastened thereto using screws. A zoom motor 601 and gear trains 603 to 606 shown in FIG. 4 are provided on the sensor holder 501. A gear 602 is attached to a driving shaft in the zoom motor 601, and the gear 602 is rotated by a driving force of the zoom motor 601 to transfer the driving force to a barrel member through the gear trains 603 to 606 and thus the lens barrel can be driven in the optical axis direction. The gear trains 603 to 606 are cluster gears having a large-diameter gear and a small-diameter gear having different numbers of teeth on the same shaft. The final gear 606 engaged with the movable cam ring 503 is also a cluster gear and is composed of a large-diameter gear part and a small-diameter gear part longer in the optical axis direction.

Next, a cylinder member and a zoom driving mechanism for moving each lens group in the optical axis direction will be described. As shown in FIGS. 1 and 2, the movable cam ring 503 is disposed on the outer circumference of each lens group. Cam grooves 503a, 503b and 503c of three types having different loci are formed on the inner circumference of the movable cam ring 503, as shown in FIG. 3. Follower pins 12a, 21a and 32a formed on the outer circumferences of the first-group ground plate 12, the diaphragm unit 21 and the second-group ground plate 32 are respectively engaged with the cam grooves 503a, 503b and 503c to be able to follow them.

Figure 2:
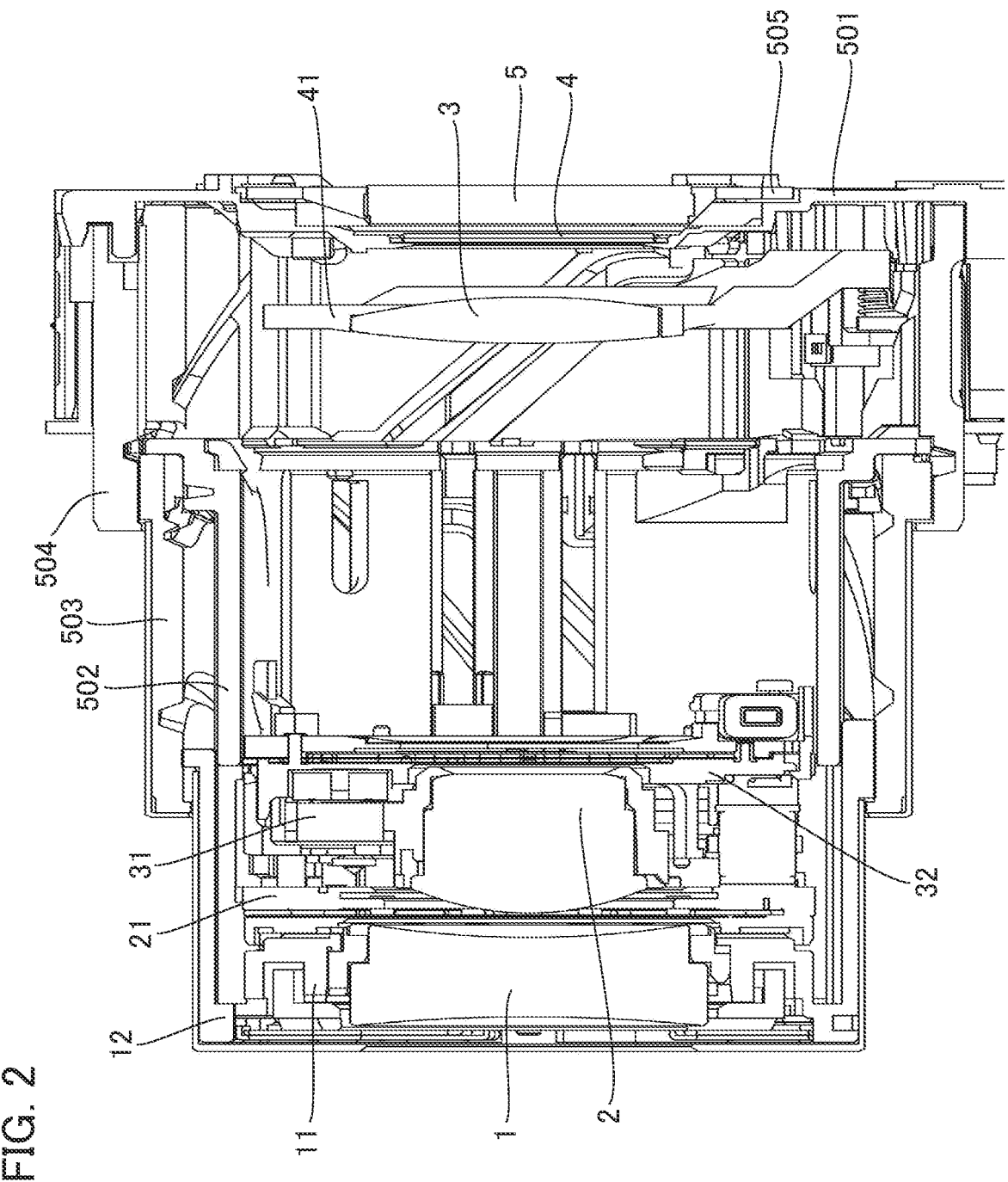
FIG. 2 is a diagram showing a photographing state.

In addition, as shown in FIGS. 1 and 2, a rectilinear movement guide cylinder 502 for rotation restriction for restricting rotation when each lens group moves is provided on the inner circumference of the movable cam ring 503. The rectilinear movement guide cylinder 502 and the movable cam ring 503 are so-called bayonet-connected and approximately integrally move in the optical axis direction, and the movable cam ring 503 is relatively rotatable with respect to the rectilinear movement guide cylinder 502.

Further, long grooves 502a, 502b and 502c extending in the optical axis direction are provided on the rectilinear movement guide cylinder 502, as shown in FIG. 3. The first-group ground plate 12, the diaphragm unit 21 and the second-group ground plate 32 rectilinearly move in the optical axis direction when being rotationally restricted by the long grooves 502a, 502b and 502c. A cam groove 504a and a rectilinear movement guide groove 504b which is a linear groove are formed on the inner circumference of the fixed cam ring 504. As shown in FIG. 3, a follower pin 503d formed on the outer circumference of the movable cam ring 503 is engaged with the cam groove 504a to be able to follow the cam groove 504a, and the guide groove 504b is slidably fitted to a rectilinear movement restricting part 502d of the rectilinear movement guide cylinder 502.

In addition, a gear part 503e is formed on the outer circumference of the movable cam ring 503, as shown in FIG. 3. The zoom motor 601 starts to drive such that the driving force is transferred from the final gear 606 of the gear trains 603 to 606 to the gear part 503e of the movable cam ring 503 and thus a rotation operation is performed. Accordingly, the movable cam ring 503 rotates in the optical axis direction while being engaged with and following the cam groove 504a formed on the inner circumference of the fixed cam ring 504.

The gear part 503e included in the movable cam ring 503 is engaged with a small-diameter gear which is a part of the final gear 606. A large-diameter gear is positioned behind the small-diameter gear (at the imaging element) in the optical axis direction and engaged with the gear 605. A long gear part of the gear 606 is formed to be long in the optical axis direction in accordance with an extending amount of the movable cam ring 503 to correspond to movement of the movable cam ring 503 in the optical axis direction. The rectilinear movement guide cylinder 502 moves in the optical axis direction integrally with the movable cam ring 503. Since the rectilinear movement restricting part 502d included in the rectilinear movement guide cylinder 502 is slidably fitted to the rectilinear movement guide groove 504b included in the fixed cam ring 504 to restrict rotation, the rectilinear movement guide cylinder 502 performs only rectilinear movement. According to the aforementioned configuration, the movable cam ring 503 rotates and thus the first-group unit, the diaphragm unit 21 and the second-group unit which follow the movable cam ring 503 move in the optical axis direction while rectilinear movement thereof is restricted. The fixed cam ring 504 is connected to the sensor holder 501 through a screw and configured integrally therewith, as shown in FIGS. 1 to 3, and thus neither move in the optical axis direction nor a rotation direction.

Figure 5B:
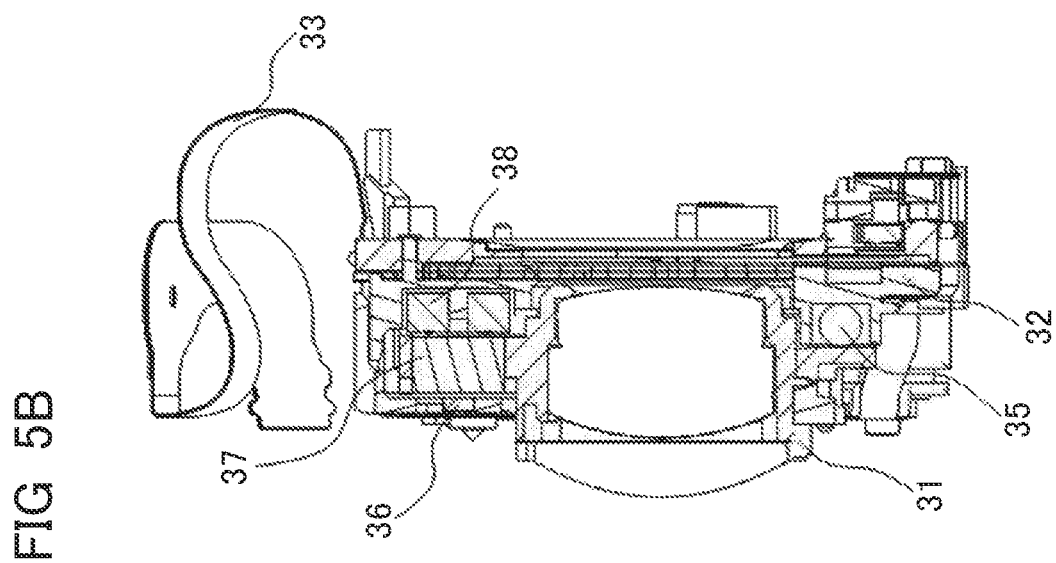
FIGS. 5A and 5B are diagrams showing an example of a configuration of an image stabilizing device included in an image pickup apparatus.
Figure 5A:
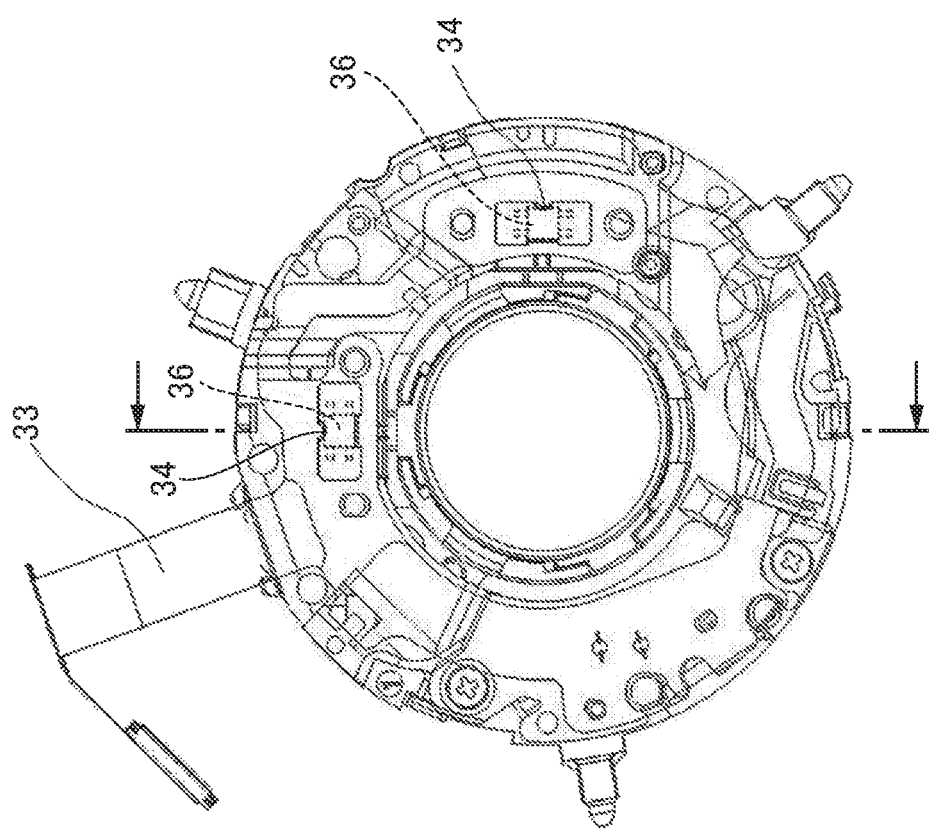

FIGS. 5A and 5B are diagrams showing an example of a configuration of an image stabilizing device included in the image pickup apparatus.

FIG. 5A is a front view viewed from a subject side of the second-group unit. FIG. 5B is a cross-sectional view when the image stabilizing device shown in FIG. 5A is cut at a lens center.

A lens driving unit is provided at the side of the outer circumference of the second-group ground plate 32. The lens driving unit is composed of a magnet 37 and a coil 38. The lens driving unit moves the second-group lens holding frame 31 which holds the second-group lens 2 as a blur correction lens in a direction perpendicular to the optical axis. Accordingly, the second-group lens 2 corrects image blur occurring due to vibration applied to the image pickup apparatus. A shutter driving unit for driving a shutter mechanism, which is not shown, is provided at the side of the outer circumference of the second-group lens 2 of the second-group ground plate 32, and an ND driving unit for driving an ND filter, which is not shown, is provided at the side of an image surface of the second-group ground plate 32.

In addition, the second-group lens holding frame 31 and the second-group ground plate 32 are connected in the optical axis direction by two tension springs (not shown). The second-group lens holding frame 31 is pushed to one side with respect to the second-group ground plate 32 having a ball 35 interposed therebetween in the direction of the optical axis by a biasing force of the two tension springs. In addition, the second-group lens holding frame 31 which holds the second-group lens 2 moves in a direction perpendicular to the optical axis according to rolling of the ball 35.

A Hall element holder 34 is disposed on the subject side of the second-group ground plate 32. A shutter FPC 33 is laid on the Hall element holder 34 and pulled out to the side of the image surface along a pull-out surface of the outer circumference of the Hall element holder 34 in a state in which the shutter FPC 33 is connected to the lens driving unit, the shutter driving unit and the ND driving unit. Hall elements 36 for detecting the position of the second-group lens 2 are mounted at two points separated from each other by 90° in a circumferential direction on the shutter FPC 33 and connected to a lens-barrel FPC which is not shown through the shutter FPC 33. The shutter FPC 33 is fixed to the Hall element holder 34, and the Hall element holder 34 is engaged with the second-group ground plate 32 through snap-fit connection having the second-group lens 2 interposed therebetween.

The magnet 37 magnetized to have the Hall element 36 between the N pole and the S pole is provided in the second-group lens holding frame 31 and a control unit of a camera main body detects magnetic fields penetrating the magnet 37 as outputs of the two Hall elements 36. When the second-group lens holding frame 31 moves in a plane perpendicular to the optical axis, magnetic fields penetrating the Hall elements 36 change and thus the outputs of the Hall elements 36 change. Accordingly, the position of the second-group lens holding frame 31 can be detected.

Further, the coil 38 is disposed at a position opposite the magnet 37 and the side of the image surface in the optical axis direction. The coil 38 is attached to the second-group ground plate 32. The coil 38 is connected to the lens-barrel FPC which is not shown through the shutter FPC 33 and provided with power from a power supply unit of the camera main body. In addition, the coil 38 is biased to generate an electromagnetic force, and thus the second-group lens holding frame 31 can be driven.

Figure 6A:
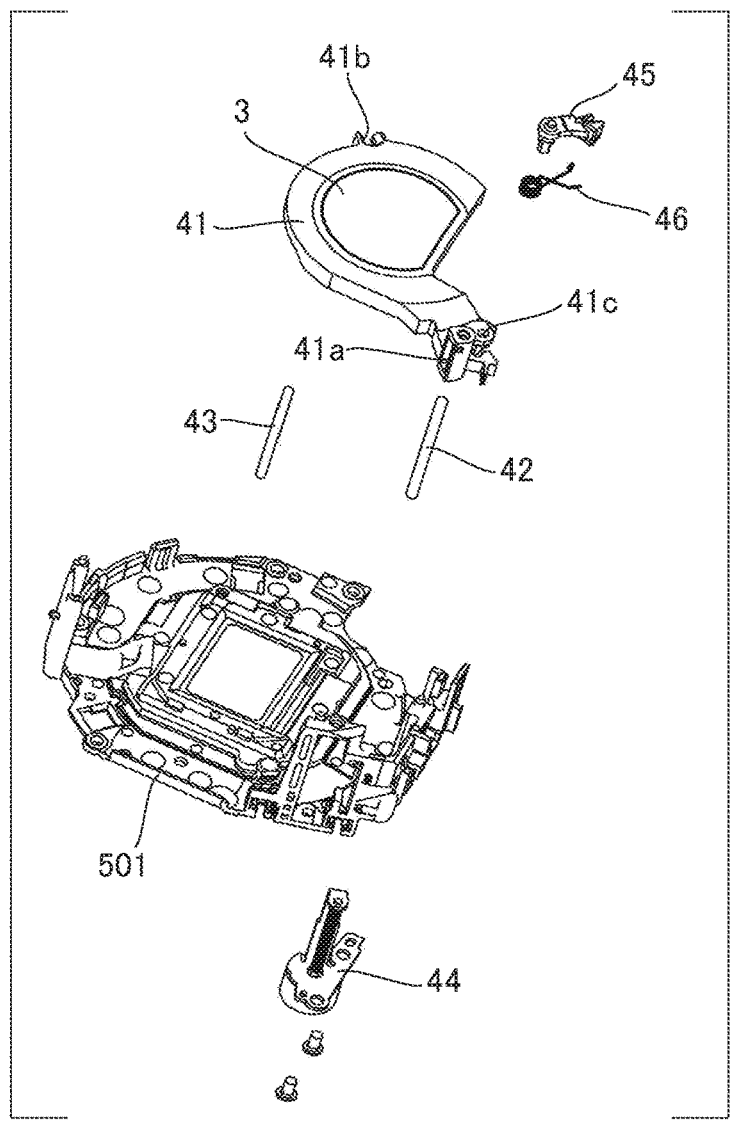
FIGS. 6A and 6B are diagrams showing an example of a configuration of a focus driving mechanism.
Figure 6B:
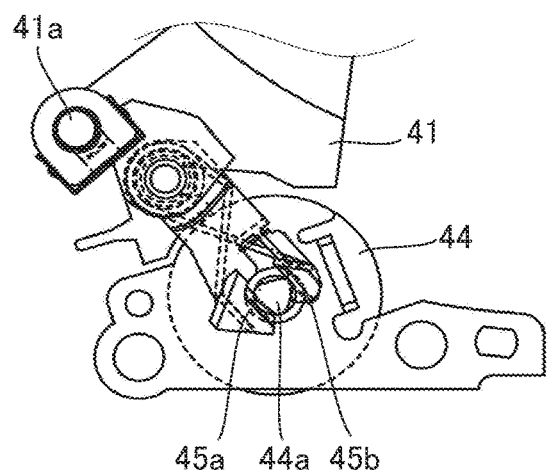

FIGS. 6A and 6B are diagrams showing an example of a configuration of a focus driving mechanism attached to the sensor holder unit.

The sensor holder 501 supports the third-group lens holding frame 41 such that the third-group lens holding frame 41 can rectilinearly move in the optical axis direction. That is, a main guide shaft 42 parallel with a photographing optical axis is press-fitted into a hole part of the sensor holder 501 to be fixed to the sensor holder 501, as shown in FIGS. 3, 6A and 6B. Further, a sub-guide shaft 43 for restricting rotation is press-fitted into the hole part of the sensor holder 501 to be fixed like the main guide shaft 42. In addition, a focus driving motor 44 is fastened and fixed to the sensor holder 501 by means of screws, as shown in FIGS. 6A and 6B. A sleeve 41a is formed at the third-group lens holding frame 41. A sleeve hole having both edges engaged with the main guide shaft 42 is formed in the sleeve 41a and a sleeve opening is formed at the center of the sleeve 41a. Further, a U-shaped groove 41b engaged with the sub-guide shaft 43 is formed in the third-group lens holding frame 41. In addition, a support hole 41c for supporting a rack 45 is provided in proximity to the sleeve 41a in the third-group lens holding frame 41.

The rack 45 includes engagement teeth 45a engaged with a lead screw 44a formed integrally with a motor output shaft, and biasing teeth 45b facing the engagement teeth 45a. In addition, a support shaft engaged with a support hole of the third-group lens holding frame 41 is formed in the rack 45. The biasing teeth 45b are pressed in a direction in which the biasing teeth 45b engage with the lead screw 44a by means of an arm part of a torsion coil spring 46, and the arm part of the torsion coil spring 46 is hooked on the rear side of the rack 45. Accordingly, the biasing teeth 45b and the engagement teeth 45a pinch the lead screw 44a therebetween and are engaged with the lead screw 44a all the time.

In addition, the torsion coil spring 46 also biases the rack 45 in a direction facing the end face of the third-group lens holding frame 41 in the optical axis direction to prevent backlash between the rack 45 and the third-group lens holding frame 41 and stabilize them in the optical axis direction such that driving with high accuracy can be achieved. In such a configuration, when the lead screw 44a of the focus driving motor 44 rotates, the third-group lens holding frame 41 moves forward and backward in the optical axis direction according to a screwing relation between the rack 45 and the lead screw 44a.

Figure 7:
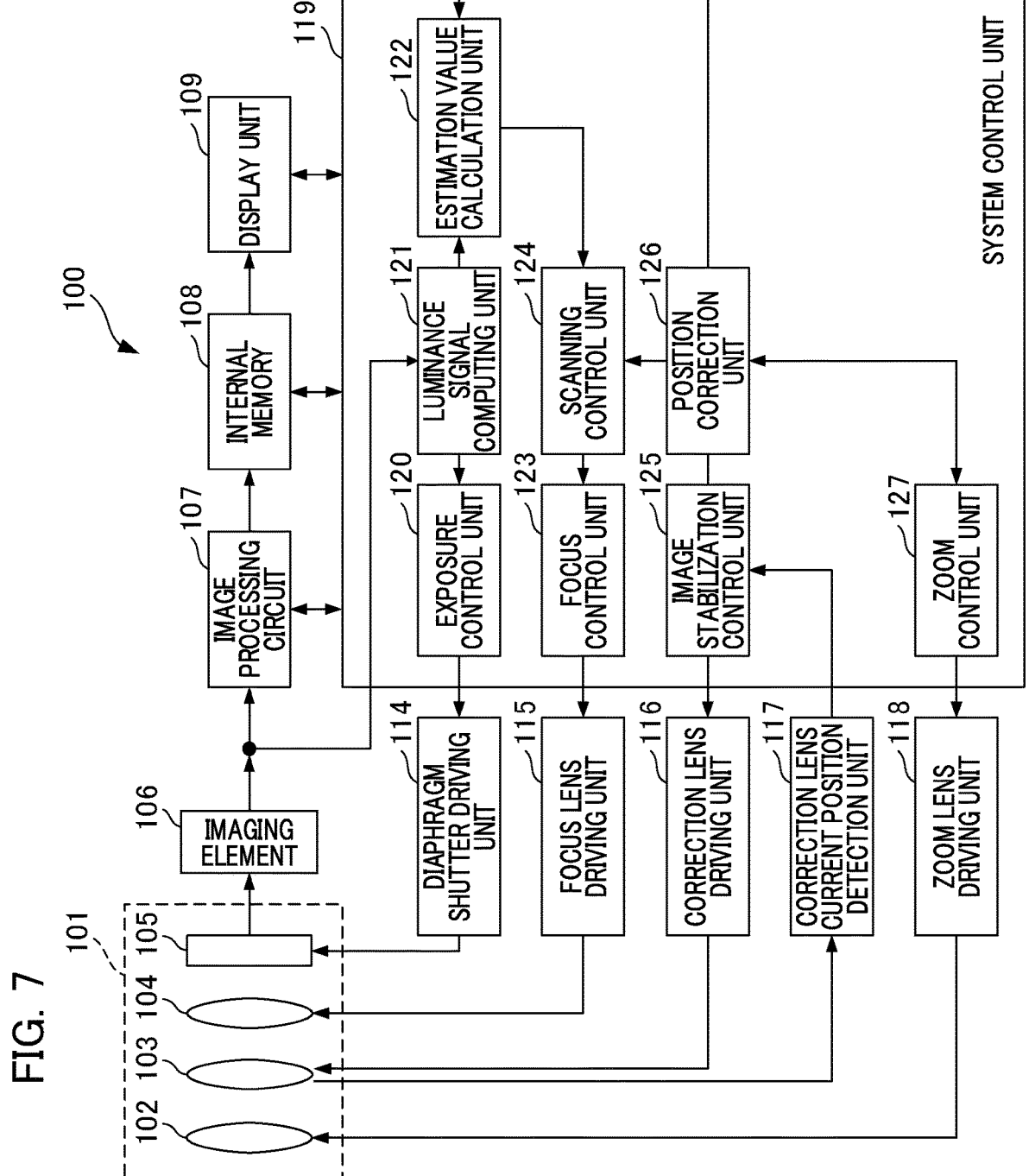
FIG. 7 is a functional block diagram of an image pickup apparatus.

FIG. 7 is a functional block diagram of the image pickup apparatus of the present embodiment.

FIG. 7 shows a configuration of a digital camera 100 as an example of the image pickup apparatus. The digital camera 100 includes a lens barrel 101 and a zoom control unit 127. The lens barrel 101 holds a lens group therein and drives lenses. A blur correction lens 103 serves as a blur correction unit used to correct image blur occurring due to vibration applied to the image pickup apparatus. The blur correction lens 103 is an optical member which moves in a direction different from an optical axis of an imaging optical system and corrects image blur by off-centering the optical axis. A focus lens 104 is a first optical member used to adjust a focus point (focus adjustment). A zoom lens 102 is a second optical member used to optically change an angle of view by controlling the focal distance. A diaphragm and shutter 105 is used for exposure control for adjusting the quantity of light.

Light which has passed through the lens barrel 101 is received by an imaging element 106 using a charge coupled device (CCD), a complementary metal oxide semiconductor (CMOS) or the like and converted from an optical signal into an electrical signal. The electrical signal is input to an image processing circuit 107, subjected to a pixel interpolation process, a color conversion process and the like and then sent to an internal memory 108 as image data. A display unit 109 displays imaging information and the like along with a captured image. A compression/decompression processor 110 compresses or decompresses data stored in the internal memory 108 according to an image format. A storage unit 111 stores various types of data such as parameters. A vibration detection unit 113 detects vibration (shaking) applied to the digital camera 100.

A system control unit 119 controls the digital camera 100 overall. The function of the image stabilizing device of the present embodiment is realized by the system control unit 119. The system control unit 119 is configured as an operation device such as a central processing unit (CPU) to execute various control programs stored in the internal memory 108, for example, programs for performing AE control, AF control, image stabilizing control, zoom control and the like, according to a user operation.

The system control unit 119 includes an exposure control unit 120 and the zoom control unit 127. A luminance signal computing unit 121 computes an electrical signal output from the imaging element 106 as a luminance of a subject. The exposure control unit 120 calculates exposure control values (a diaphragm value and a shutter speed) on the basis of luminance information obtained by the luminance signal computing unit 121 and sends a calculation result to a diaphragm shutter driving unit 114. The diaphragm shutter driving unit 114 drives the diaphragm and shutter 105 on the basis of the calculation result sent from the exposure control unit 120. In this manner, automatic exposure (AE) control is performed.

An estimation value calculation unit 122 extracts a specific frequency component from the luminance signal computed by the luminance signal computing unit 121 and then calculates an AF estimation value (contrast estimation value) on the basis of a focus lens correction amount output from a position correction unit 126. The focus lens correction amount is a correction amount for the position of the focus lens 104. A scanning control unit 124 performs driving commands in a predetermined range for the focus control unit 123. In addition, the scanning control unit 124 calculates a form of contrast with reference to an AF estimation value which is a calculation result of the estimation value calculation unit 122 at a predetermined position of the focus lens 104 on the basis of the output of the position correction unit 126. A focus point at which contrast is highest is regarded as a point at which a light flux is focused on the surface of the imaging element 106. The focus control unit 123 controls a focus lens driving unit 115 such that the focus lens 104 is driven on the basis of the output of the scanning control unit 124. Accordingly, automatic focus (AF) control is performed.

A correction lens current position detection unit 117 detects a current position of the blur correction lens 103. An image stabilization control unit 125 outputs a control signal for correcting image blur on the basis of the current position of the correction lens 103 and a vibration detection signal output from the vibration detection unit 113. A correction lens driving unit 116 drives the blur correction lens 103 on the basis of the control signal output from the image stabilization control unit 125.

A position correction unit 126 calculates a focus lens correction amount on the basis of a movement amount (driving amount) of the blur correction lens 103 which corresponds to the control signal output from the image stabilization control unit 125. In addition, the position correction unit 126 calculates a correction amount for the position of the zoom lens 102 (zoom lens correction amount) on the basis of the driving amount of the blur correction lens 103. In this example, it is assumed that information (first information) representing relationships between driving amounts of the blur correction lens and focus lens correction amounts and information (second information) representing relationships between driving amounts of the blur correction lens and zoom lens correction amounts are stored in advance in the internal memory 108. The position correction unit 126 calculates a focus lens correction amount on the basis of the first information stored in the internal memory 108. In addition, the position correction unit 126 calculates a zoom lens correction amount on the basis of the second information stored in the internal memory 108. A zoom control unit 127 outputs a control signal used to drive the zoom lens 102. The zoom control unit 127 outputs a control signal on the basis of a zoom operation instruction from an operation unit 112. Further, if the position correction unit 126 calculates a zoom lens correction amount, the zoom control unit 127 outputs a control signal in response to the zoom lens correction amount. A zoom lens driving unit 118 drives the zoom lens 102 on the basis of the control signal output from the zoom control unit 127.

The operation unit 112 is a user interface which performs various menu operations and a mode switching operation. For example, the operation unit 112 performs switching between a still image and a moving image and switching between manual focus and automatic focus according to user operations. The operation unit 112 includes a release button for turning on a first switch SW1 and a second switch SW2 in turn in response to a pressing amount. In the example shown in FIG. 7, SW1 is on when the release button is pressed about half and SW2 is on when the release button is completely pressed. When SW1 is on, the exposure control unit 120 calculates exposure control values (a diaphragm value and a shutter speed). When SW2 is on, the exposure control unit 120 controls the diaphragm shutter driving unit 114 on the basis of the diaphragm value and the shutter speed. Image data acquired as a result of imaging performed by the imaging element 106 is stored in the storage unit 111. When a so-called live image acquired in a state in which the release button is not pressed is displayed, the exposure control unit 120 is provided for exposure during still image photographing to preliminarily determine a diaphragm value and a shutter speed at predetermined intervals on the basis of luminance information about an image signal and a program diagram.

FIGS. 8A to 8D are diagrams describing subject out-of-focus which is a phenomenon occurring when the blur correction lens is separated from the optical axis of the imaging optical system.

Figure 8A:
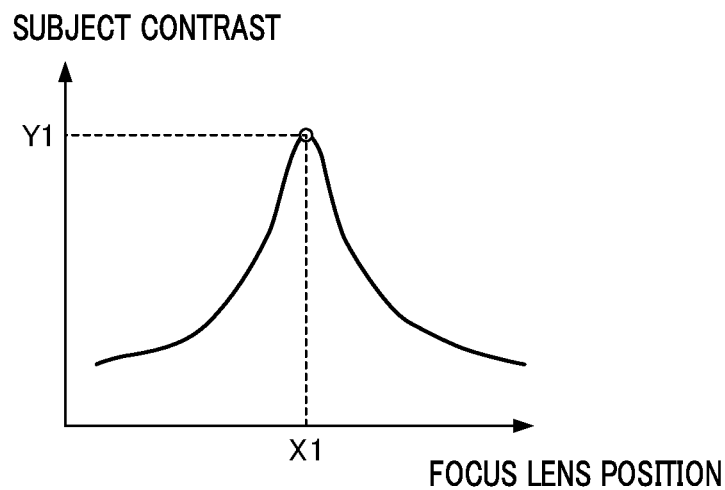
FIGS. 8A to 8D are diagrams for explaining subject out-of-focus.
Figure 8C:
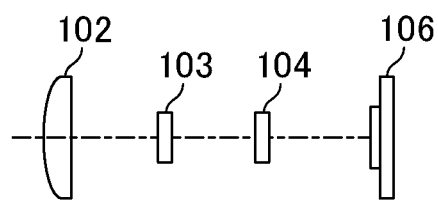
Figure 8B:
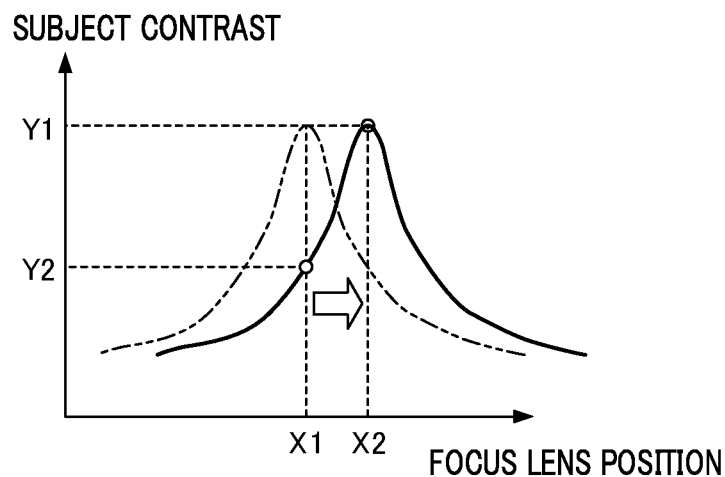

FIGS. 8A and 8B show a relationship between the contrast of a subject and the position of the focus lens 104. The X axis represents the position of the focus lens 104. The Y axis represents an estimation value of the contrast of the subject (contrast estimation value). As shown in FIGS. 8A and 8B, the contrast estimation value changes according to the position of the focus lens 104 and thus a mountain form due to a height difference in the contrast can be formed. The peak of the mountain is a position at which the contrast estimation value is maximized, and focusing is achieved when the focus lens 104 is disposed at this position.

Figure 8D:
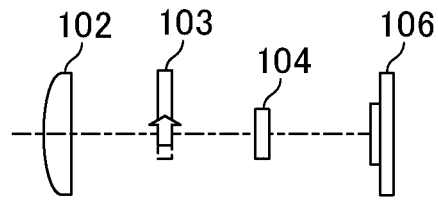

FIG. 8C shows a state in which the blur correction lens 103 and other lenses included in the lens barrel 101 are disposed on the same optical axis. If the blur correction lens 103 is placed at the position shown in FIG. 8C, the contrast estimation value corresponding to a position X1 of the focus lens 104 is maximized, as shown in FIG. 8A. FIG. 8D shows a state in which the blur correction lens 103 is driven to be separated from the optical axis and disposed. If the blur correction lens 103 is placed at the position shown in FIG. 8D, the mountain form shown in FIG. 8A is deviated to the right and thus the contrast estimation value corresponding to a position X2 of the focus lens 104 is maximized, as shown in FIG. 8B.

A state in which the focus lens 104 operates to move to the position X1 and stops at the position X1 to focus the subject when the blur correction lens 103 is positioned on the optical axis is assumed. Thereafter, when the blur correction lens 103 is driven, the contrast estimation value decreases from Y1 to Y2 at the position X1 of the focus lens 104, as shown in FIG. 8B. Accordingly, a photographing operation is performed in a state in which the contrast estimation value is low. Further, since hand tremor of a photographer constantly changes rather than being uniform, the movement of the blur correction lens 103 is not uniform and the contrast of a subject also constantly changes. Accordingly, it is necessary to drive the focus lens 104 (perform focus correction control) in response to movement of the blur correction lens 103.

Figure 9A:
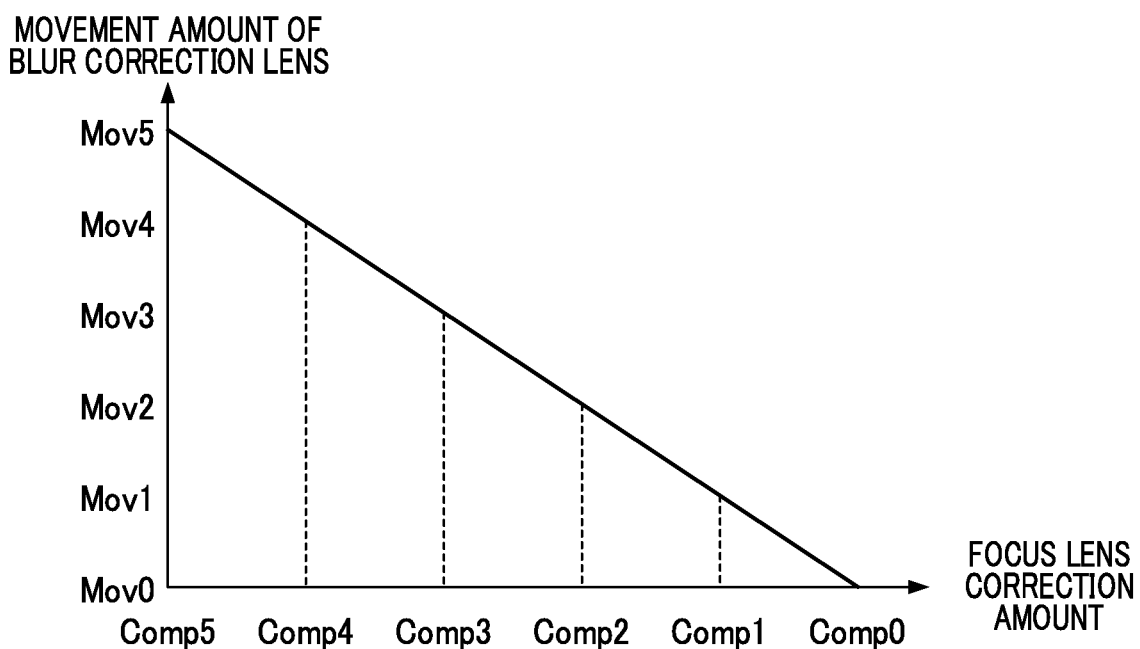
FIGS. 9A and 9B are diagrams for explaining relationships between a movement amount of a blur correction lens and a focus lens correction amount and a zoom lens correction amount.
Figure 9B:
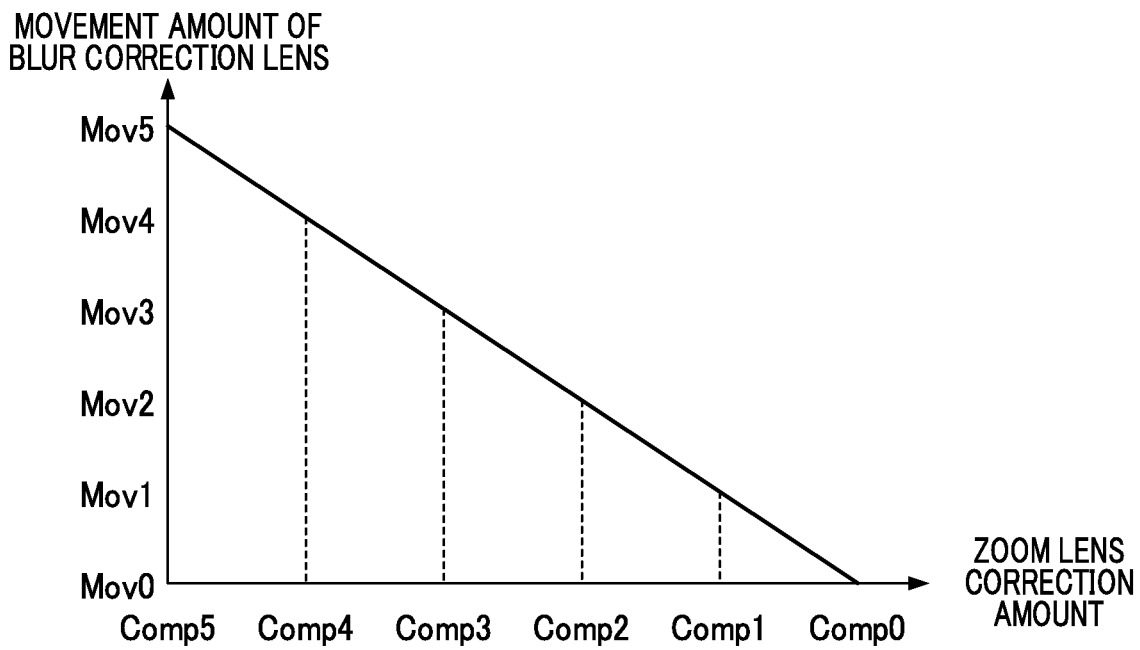

FIGS. 9A and 9B are diagrams describing relationships between a movement amount (driving amount) of the blur correction lens and a focus lens correction amount and a zoom lens correction amount. Operations of the blur correction lens, the focus lens and the zoom lens before and after photographing will be described with reference to the graphs shown in FIGS. 9A and 9B.

FIG. 9A shows a relationship between a driving amount of the blur correction lens 103 and a focus lens correction amount. The Y axis represents the position of the blur correction lens 103 from the optical axis. The X axis represents a correction amount of the position of the focus lens 104 (focus lens correction amount) to be corrected when the blur correction lens 103 has been driven. Compx (x=0 to 5) represents a focus lens correction amount. The focus lens correction amount increases as x increases. That is, Comp0 is zero and Comp5 is a maximum.

If the position of the blur correction lens 103 is 0 degrees, that is, the center of the optical axis, the driving amount of the blur correction lens 103 is represented as Mov0 in the graph of FIG. 9A. If the driving amount of the blur correction lens 103 is Mov0, the focus lens correction amount is Comp0. As specific numerical values, Mov0 is 0 degrees and the focus lens correction amount is Comp0. In addition, if the position of the blur correction lens 103 is farthest from the center of the optical axis, the driving amount of the blur correction lens 103 is represented as Mov5 in the graph of FIG. 9A. If the driving amount of the blur correction lens 103 is Mov5, the focus lens correction amount is Comp5. In the present embodiment, the first information representing relationships between driving amounts of the blur correction lens 103 and focus lens correction amounts is stored in the internal memory 108, and the position correction unit 126 calculates a focus lens correction amount with reference to the first information in the internal memory 108. Accordingly, when a predetermined subject is photographed, the focus lens 104 moves by an amount corresponding to a hand tremor amount of a photographer and thus deterioration of the contrast of the subject on a live view is prevented.

FIG. 9B is a diagram describing a relationship between a driving amount of the blur correction lens 103 and a zoom lens correction amount. The Y axis represents the position of the blur correction lens 103 from the optical axis. The X axis represents a correction amount of the zoom lens 102 (zoom lens correction amount) to be corrected when the blur correction lens 103 has been driven. Compx (x=0 to 5) represents a zoom lens correction amount. The zoom lens correction amount increases as x increases. That is, Comp0 is zero and Comp5 is a maximum.

If the position of the blur correction lens 103 is 0 degrees, that is, the center of the optical axis, the driving amount of the blur correction lens 103 is represented as Mov0 in the graph of FIG. 9B. If the driving amount of the blur correction lens 103 is Mov0, the zoom lens correction amount is Comp0. As specific numerical values, Mov0 is 0 degrees and the zoom lens correction amount is Comp0. In addition, if the position of the blur correction lens 103 is farthest from the center of the optical axis, the driving amount of the blur correction lens 103 is represented as Mov5 in the graph of FIG. 9B. If the driving amount of the blur correction lens 103 is Mov5, the zoom lens correction amount is Comp5. In the present embodiment, the second information representing the relationship between driving amounts of the blur correction lens 103 and zoom lens correction amounts is stored in the internal memory 108, and the position correction unit 126 calculates a zoom lens correction amount with reference to the second information in the internal memory 108. Accordingly, when a predetermined subject is photographed, the zoom lens 102 moves by an amount corresponding to a hand tremor amount of a photographer and thus deterioration of the contrast of the subject on a live view can be prevented.

Numerical values including Mov5 and Comp5 in FIGS. 9A and 9B change according to characteristics of the imaging optical system. Further, although the relationships between the driving amount of the blur correction lens and the focus lens correction amount and the zoom lens correction amount are linear in FIGS. 9A and 9B, these relationships may change to curved lines according to characteristics of the imaging optical system.

The image pickup apparatus of the present embodiment drives the focus lens 104 and the zoom lens 102 in connection with driving of the blur correction lens 103 on the basis of the first information and the second information stored in the internal memory 108. Accordingly, it is possible to correct a deviation in an angle of view due to correction of the position of the focus lens 104 in response to driving of the blur correction lens 103 by driving the zoom lens 102.

Figure 10:
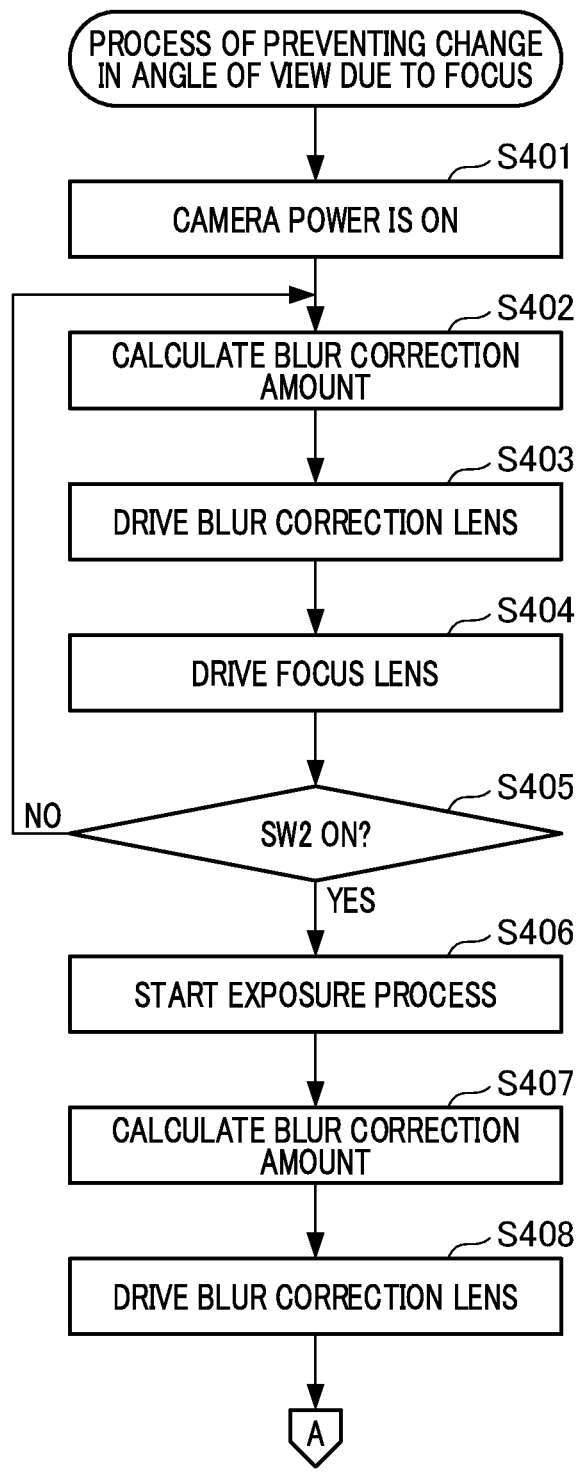
FIG. 10 is a flowchart for explaining an operation process of an image pickup apparatus.
Figure 11:
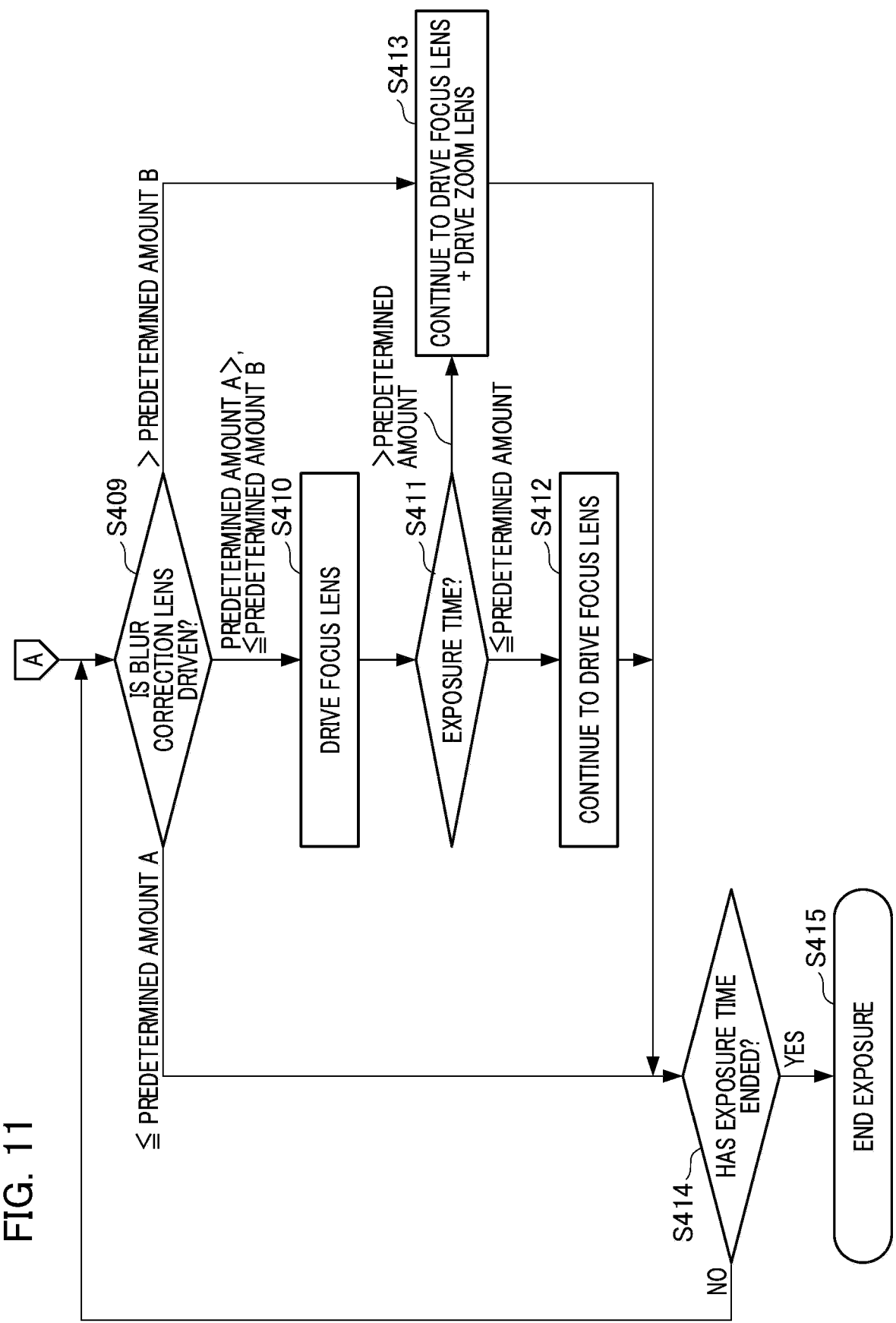
FIG. 11 is a flowchart for explaining the operation process of the image pickup apparatus.

FIGS. 10 and 11 are flowcharts describing an operation process of the image pickup apparatus of the present embodiment.

The process pertaining to the flowcharts to be described with reference to FIGS. 10 and 11 is performed under the control of the system control unit 119. In S401 of FIG. 10, power is on. In S402, the system control unit 119 calculates an image stabilization amount in response to vibration applied to the digital camera 100. Subsequently, the system control unit 119 drives the blur correction lens 103 on the basis of the calculated image stabilization amount in S403. Accordingly, image stabilization control is started.

Next, the system control unit 119 drives the focus lens 104 in response to a driving amount of the blur correction lens 103 in S404. Accordingly, focus correction control is started. Subsequently, the system control unit 119 determines whether SW2 is pressed in S405. If SW2 is not pressed, the process returns to S402 in a live view image state and operations of S403 and S404 are repeatedly performed. If SW2 is pressed, the system control unit 119 starts a still image photographing operation in S406. Accordingly, exposure to the imaging element 106 is started to enter a photographing state.

In S407, the system control unit 119 calculates an image stabilization amount in response to vibration applied to the digital camera 100. Subsequently, the system control unit 119 performs image stabilization control on the basis of the calculated image stabilization amount in S408. That is, the system control unit 119 serves as a first control unit which drives and controls the blur correction lens 103 during exposure. Subsequently, the process enters a loop operation in which the focus lens 104 and the zoom lens 102 are driven in connection with the blur correction lens 103 according to the system control unit 119 in S409 to S414 in FIG. 11.

In S409, the system control unit 119 determines whether the driving amount of the blur correction lens 103 is within a range of predetermined amounts (threshold values). If the driving amount of the blur correction lens 103 is equal to or less than a predetermined amount A (equal or less than a first threshold value), the system control unit 119 does not perform an operation of correcting the positions of the focus lens 104 and the zoom lens 102, and the process proceeds to S414. That is, if the driving amount of the blur correction lens 103 is equal to or less than the predetermined amount A, driving of the focus lens 104 and the zoom lens 102 in connection with driving of the blur correction lens 103 is not performed. In S414, the system control unit 119 determines whether an exposure period has ended. If the exposure period has not ended, the process returns to S409. If the exposure period has ended, the process proceeds to S415. Then, the system control unit 119 ends exposure in S415.

If the driving amount of the blur correction lens 103 is greater than the predetermined amount A and equal to or less than a predetermined amount B (equal or less than a second threshold value) in the determination process of S409, the process proceeds to S410. The predetermined amount B (second threshold value) is set to a value larger than the predetermined amount A (first threshold value). In S410, the system control unit 119 performs an operation of correcting the position of the focus lens 104 in response to the driving amount of the blur correction lens 103.

Next, the system control unit 119 determines whether an exposure time exceeds a predetermined time in S411. If the exposure time is equal to or less than the predetermined time, the system control unit 119 continues to drive the focus lens 104 without driving the zoom lens 102 in connection there with. Then, the process proceeds to step 414. If the exposure time exceeds the predetermined time, the process proceeds to S413. Then, the system control unit 119 serves as a second control unit to drive the focus lens 104 and the zoom lens 102 in connection with driving of the blur correction lens 103 in S413. Thereafter, the process proceeds to step 414.

In addition, if the system control unit 119 determines that the driving amount of the blur correction lens 103 is greater than the predetermined amount B in the determination process of S409, the process proceeds to S413. Then, the system control unit 119 drives the focus lens 104 and the zoom lens 102 in connection with driving of the blur correction lens 103 in S413.

The image pickup apparatus of the present embodiment cooperatively drives the focus lens 104 and the zoom lens 102 in connection with driving of the blur correction lens 103 according to conditions pertaining to the driving amount of the blur correction lens 103. Accordingly, it is possible to prevent an angle of view from deviation by driving the focus lens 104 in connection with driving of the blur correction lens 103 while mitigating deterioration of subject contrast due to large separation of the blur correction lens 103 from the optical axis. Consequently, a satisfactory image can be acquired.

The application range of the present invention is not limited to the above description with reference to FIGS. 10 and 11. According to the flowcharts of FIGS. 10 and 11, only the focus lens 104 is driven in connection with driving of the blur correction lens 103 and driving of the zoom lens 102 is not performed before exposure (S404 in FIG. 10). However, the system control unit 119 may drive the zoom lens 102 in connection with the focus lens 104 before exposure. In addition, if an operation mode in which focus adjustment is manually performed is set, the system control unit 119 may select an operation mode in which the focus lens 104 and the zoom lens 102 are not driven in connection with driving of the blur correction lens 103.

Although an example of application to an image pickup apparatus with respect to the present invention has been described, the present invention is not limited to the above-described embodiment and also includes various forms without departing from the scope and spirit of the present invention. For example, although the image pickup apparatus uses a lens barrel having a 3-group configuration in the above-described embodiment, the lens barrel included in the image pickup apparatus may not have the 3-group configuration.

Furthermore, the image pickup apparatus includes a plurality of blur correction lenses and the system control unit 119 drives the focus lens 104 and the zoom lens 102 in response to driving amounts of the blur correction lenses 103. In addition, an imaging element may be applied as a blur correction unit for correcting image blur instead of the blur correction lens and driven within a surface perpendicular to the operation axis.

(Other Embodiments)

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-002299, filed Jan. 11 2018, which is hereby incorporated by reference wherein in its entirety.

What is claimed is:

1. An image stabilizing device comprising at least one processor or circuit programmed to function as:
   a first control unit configured to control a blur correction unit used to correct image blur occurring due to vibration applied to an image pickup apparatus; and a second control unit configured to control a first optical member used for focus adjustment and a second optical member used to change an angle of view in connection with driving of the blur correction unit during exposure to an imaging unit,
  wherein the second control unit drives the first optical member and the second optical member in response to a driving amount of the blur correction unit.

2. The image stabilizing device according to claim 1, further comprising a memory in which first information representing a relationship between driving amounts of the blur correction unit and correction amounts of the position of the first optical member and second information representing a relationship between driving amounts of the blur correction unit and correction amounts of the position of the second optical member are stored in advance,
  wherein the second control unit drives the first optical member and the second optical member on the basis of the first information and the second information stored in the memory.

3. The image stabilizing device according to claim 1, wherein the second control unit does not drive the first optical member and the second optical member in connection with driving of the blur correction unit if the driving amount of the blur correction unit is equal to or less than a first threshold value.

4. The image stabilizing device according to claim 3, wherein the second control unit drives the first optical member in connection with driving of the blur correction unit if the driving amount of the blur correction unit is greater than the first threshold value and equal to or less than a second threshold value larger than the first threshold value.

5. The image stabilizing device according to claim 4, wherein the second control unit does not drive the second optical member in connection with driving of the blur correction unit if an exposure time for the imaging unit is equal to or less than a predetermined time even if the driving amount of the blur correction unit is greater than the first threshold value and equal to or less than the second threshold value.

6. The image stabilizing device according to claim 4, wherein the second control unit drives the first optical member and the second optical member in connection with driving of the blur correction unit if the driving amount of the blur correction unit is greater than the second threshold value.

7. The image stabilizing device according to claim 1, wherein the second control unit drives the first optical member in connection with driving of the blur correction unit and does not drive the second optical member before exposure to the imaging unit.

8. The image stabilizing device according to claim 1, comprising a plurality of blur correction units,
  wherein the second control unit drives and controls the first optical member and the second optical member in connection with driving of each of the blur correction units during exposure.

9. The image stabilizing device according to claim 1, further comprising a selection unit configured to select an operation mode in which the first optical member and the second optical member are not driven in connection with driving of the blur correction unit if an operation mode in which the focus adjustment is manually performed is set.

10. The image stabilizing device according to claim 1, wherein the blur correction unit is an optical member moving in a direction different from an optical axis of an imaging optical system.

11. The image stabilizing device according to claim 1, wherein the blur correction unit is a lens moving in a direction different from an optical axis of an imaging optical system.

12. The image stabilizing device according to claim 1, wherein the blur correction unit is an image sensor moving in a direction different from an optical axis of an imaging optical system.

13. A control method of an image stabilizing device, comprising:
  controlling a blur correction unit used to correct image blur occurring due to vibration applied to an image pickup apparatus; and
  controlling a first optical member used for focus adjustment and a second optical member used to change an angle of view in connection with driving of the blur correction unit during exposure to an imaging unit,
  wherein the first optical member and the second optical member are driven in response to a driving amount of the blur correction unit.

* * * * *